US012097479B2

(12) United States Patent
Yamaguchi et al.

(10) Patent No.: US 12,097,479 B2
(45) Date of Patent: Sep. 24, 2024

(54) SEPARATING COLUMN FOR SEPARATING HIPPURIC ACID AND MANDELIC ACID, LIQUID CHROMATOGRAPH FOR SEPARATING HIPPURIC ACID AND MANDELIC ACID, AND METHOD FOR ANALYZING HIPPURIC ACID AND MANDELIC ACID

(71) Applicant: SHIMADZU CORPORATION, Kyoto (JP)

(72) Inventors: Tadayuki Yamaguchi, Kyoto (JP); Daiki Fujimura, Kyoto (JP); Hideyuki Otsuki, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 914 days.

(21) Appl. No.: 17/044,393

(22) PCT Filed: Dec. 28, 2018

(86) PCT No.: PCT/JP2018/048473
§ 371 (c)(1),
(2) Date: Oct. 1, 2020

(87) PCT Pub. No.: WO2019/198280
PCT Pub. Date: Oct. 17, 2019

(65) Prior Publication Data
US 2021/0101128 A1 Apr. 8, 2021

(30) Foreign Application Priority Data
Apr. 12, 2018 (JP) ................................ 2018-076740

(51) Int. Cl.
*B01J 20/10* (2006.01)
*B01J 20/24* (2006.01)
(Continued)

(52) U.S. Cl.
CPC ............ *B01J 20/103* (2013.01); *B01J 20/24* (2013.01); *B01J 20/28052* (2013.01);
(Continued)

(58) Field of Classification Search
CPC .... B01J 20/103; B01J 20/24; B01J 20/28052; B01J 20/286; B01J 20/288; B01J 20/3204;
(Continued)

(56) References Cited

U.S. PATENT DOCUMENTS 4,539,399 A * 9/1985 Armstrong ........... B01J 20/3257 210/502.1
5,104,547 A * 4/1992 Cabrera ............... B01J 20/3259 528/38

(Continued)

FOREIGN PATENT DOCUMENTS

CN 103007906 A 4/2013
JP 7-225225 A 8/1995
JP 2000046818 A 2/2000

OTHER PUBLICATIONS

Astier, A. (abstract), Journal of Chromatography, vol. 573, No. 2, Jan. 17, 1992, pp. 318-322.*

(Continued)

*Primary Examiner* — Maureen Wallenhorst
(74) *Attorney, Agent, or Firm* — Renner, Otto, Boisselle & Sklar, LLP

(57) ABSTRACT

A separating column (12) for hippuric acid analysis is filled with a filler in which 123 μmol/g or more of β-cyclodextrin is chemically bonded to a silica matrix. By using such a filler for the separating column (12) in which 123 μmol/g or more of β-cyclodextrin is chemically bonded to the silica matrix, hippuric acid, o-methyl hippuric acid, m-methyl hippuric acid, p-methyl hippuric acid, and mandelic acid can be
(Continued)

separated without using a mobile phase containing cyclodextrin.

3 Claims, 2 Drawing Sheets

(51) Int. Cl.

| | |
|---|---|
| ***B01J 20/28*** | (2006.01) |
| ***B01J 20/281*** | (2006.01) |
| ***B01J 20/286*** | (2006.01) |
| ***B01J 20/288*** | (2006.01) |
| ***G01N 30/16*** | (2006.01) |
| ***G01N 30/72*** | (2006.01) |

(52) U.S. Cl.
CPC ........... *B01J 20/286* (2013.01); *B01J 20/288* (2013.01); *G01N 30/16* (2013.01); *G01N 30/7233* (2013.01); *B01J 2220/46* (2013.01); *B01J 2220/54* (2013.01)

(58) Field of Classification Search
CPC ............... B01J 20/3274; B01J 2220/46; B01J 2220/54; G01N 30/16; G01N 30/7233; G01N 30/34; G01N 30/482; G01N 2030/884; Y10T 436/17; Y10T 436/200833; Y10T 436/203332
USPC ............... 436/106, 128, 131, 161, 177, 178; 422/70
See application file for complete search history.

(56) References Cited

U.S. PATENT DOCUMENTS

| | | | | |
|---|---|---|---|---|
| 9,828,458 | B2 * | 11/2017 | Suri | C02F 1/683 |
| 2014/0245818 | A1 * | 9/2014 | Nakayama | H10K 85/344<br>73/61.55 |

OTHER PUBLICATIONS

Brown et al. Biological Mass Spectrometry, vol. 20, 1991, pp. 515-521.*
Office Action for corresponding CN Application No. 201880091090.6 dated Sep. 20, 2022, with English language machine translation.
Office Action for corresponding JP Application No. 2018-076740 dated Oct. 5, 2021, with English language machine translation.
International Search Report for corresponding Application No. PCT/JP2018/048473, mailed Mar. 19, 2019.
Written Opinion for corresponding Application No. PCT/JP2018/048473, mailed Mar. 19, 2019.
Matsui, Hisao et al., High-performance liquid chromatographic separation of urinary hippuric o-, m- and p-methylhippuric acids with a B-cyclodextrin-bonded column, Journal of Chromatography, 198 9, 4 96, pp. 189-193.
Cyclobond Series HPLC Column Operating Instructions, Product Information_Sheet, [retrieved Mar. 2019], SIGMA-ALDRICH co. [online], 2006, p. 1-3, [Internet: <URL:https://www.sigmaaldrich.com/content/dam/sigm a-aldrich/docs/Supelco/Product_Information_Sheet/t70 6018.pdf>].
Saito, Takeshi et al., Simultaneous detection of hippuric acid and methylhippuric acid in urine by empore disk and gas chromatography-mass spectrometry, Journal of Pharmaceutical and Biomedical Analysis, 2002, pp. 365-370.

* cited by examiner

Signal intensity
Time (minutes)
(A) 58 μ mol/g
(B) 123 μ mol/g
(C) 207 μ mol/g
(D) 272 μ mol/g
0.00
0.50
1.00
1.50
2.00
2.50
3.00
3.50
1, 2
3, 4
5
※

SEPARATING COLUMN FOR SEPARATING HIPPURIC ACID AND MANDELIC ACID, LIQUID CHROMATOGRAPH FOR SEPARATING HIPPURIC ACID AND MANDELIC ACID, AND METHOD FOR ANALYZING HIPPURIC ACID AND MANDELIC ACID

TECHNICAL FIELD

The present invention relates to a separating column for separating hippuric acid and mandelic acid, a liquid chromatograph for separating hippuric acid and mandelic acid, and a method for analyzing hippuric acid and mandelic acid.

BACKGROUND ART

Toluene and xylene have been used in large amounts as solvents for paints and adhesives, and job-related intoxation examples and adolescent sniffing glue-related intoxation examples have been reported. In Japan, based on the Industrial Hygiene Standards Act, workers engaged in operations which use organic solvent are obliged to undergo special health examination to measure urinary metabolites (hippuric acid for toluene and methyl hippuric acid for xylene) as exposure indicators of organic solvents. The urinary metabolites are measured by the HPLC-UV method in clinical testing laboratories.

FUJI KEIZAI CO., LTD. has reported that the global clinical examination market may reach USD 70.4 billion (JPY 720 billion) in 2020, and the average annual growth rate of the global clinical examination market from 2015 is maintained at 2.4%. In the three markets of Japan, the United States of America, and Europe, the renewal of apparatuses is required in most cases, but in emerging countries (Eastern Europe, Russia, China, South America, Africa), testing environments are under development. Accordingly, it is expected that the strengthening of testing systems including introduction of apparatuses is accelerated in the emerging countries, which may drive the clinical examination market in the future.

In Japan, major clinical testing laboratories (SRL, BML, LSI Medience Corporation, Falco Holdings Co., Ltd., Kotobiken Medical Laboratories, Inc., Hoken Kagaku, Inc.) and the like undertake urine metabolite analysis. These clinical testing laboratories have actively introduced ultra-high-speed LC systems and employed new analytical methods for the purpose of streamlining analytical job and improving productivity. The urinary metabolites are measured by the HPLC-UV method in clinical testing laboratories.

SUMMARY OF THE INVENTION

Problems to be Solved by the Invention

In a test by the HPLC-UV method, reversed-phase analysis, in which a solution containing a phosphate buffer solution and acetonitrile is used as a mobile phase, has been conducted using a C18 column as a separating column. However, in such a reversed-phase analysis, all components to be analyzed, such as hippuric acid, o-methyl hippuric acid, m-methyl hippuric acid, p-methyl hippuric acid, and mandelic acid, could not be separated.

Therefore, analysis using a liquid containing cyclodextrin as a mobile phase has also been conducted. However, since cyclodextrin and the buffer solution are apt to precipitate as salts, they may cause problems in the separating column and the apparatus, and analysis using a mass spectrometer cannot be performed.

The present invention has been made in view of the above problems, and an object of the present invention is to enable the separation and analysis of hippuric acids without using a mobile phase containing cyclodextrin.

Solutions to the Problems

A separating column for hippuric acid analysis according to the present invention is filled with a filler in which 123 μmol/g or more of β-cyclodextrin is chemically bonded to a silica matrix. The present inventors confirm that the filler in which 123 μmol/g or more of β-cyclodextrin is chemically bonded to the silica matrix is used as the filler for the separating column, which makes it possible to separate hippuric acid, o-methyl hippuric acid, m-methyl hippuric acid, p-methyl hippuric acid, and mandelic acid without using a mobile phase containing cyclodextrin. Therefore, by using the separating column according to the present invention, hippuric acids can be separated and analyzed without using the mobile phase containing cyclodextrin.

In an experiment conducted by the present inventors, it is confirmed that, as the amount of β-cyclodextrin chemically bonded to the silica matrix is increased, the separation of the hippuric acids is improved. Meanwhile, in the same experiment, it is also confirmed that, as the amount of β-cyclodextrin chemically bonded to the silica matrix is increased, the elution time of each component from the separating column is increased. In order to efficiently test a large number of specimens, it is necessary to shorten a time required to analyze one specimen, and it is ideal that the time required to analyze one specimen is 5 minutes or less, and more preferably, 4 minutes or less.

The present inventors confirm that the amount of β-cyclodextrin chemically bonded to the silica matrix is adjusted to 272 μmol/g or less, whereby hippuric acids which are components to be analyzed, that is, hippuric acid, o-methyl hippuric acid, m-methyl hippuric acid, p-methyl hippuric acid, and mandelic acid can all be eluted and detected from the separating column within 4 minutes. That is, from the viewpoint of achieving the high-speed analysis of the hippuric acids, in the filler of the separating column according to the present invention, it is preferable that 123 μmol/g or more and 272 μmol/g or less of β-cyclodextrin is chemically bonded to the silica matrix.

A liquid chromatograph for hippuric acid analysis according to the present invention includes: the above-mentioned separating column; a mobile phase liquid delivery unit for delivering a mobile phase to the separating column; a sample injector for injecting a sample into the mobile phase flowing from the mobile phase liquid delivery unit toward the separating column; and a detector connected to a downstream side of the separating column to detect a component in an eluate from the separating column. The separating column filled with the filler in which 123 μmol/g or more of β-cyclodextrin is chemically bonded to the silica matrix is used, which makes it possible to separate and analyze the hippuric acids without using the mobile phase containing cyclodextrin.

A method for hippuric acid analysis according to the present invention includes the step of subjecting a sample containing at least two components of hippuric acid, o-methyl hippuric acid, m-methyl hippuric acid, p-methyl hippuric acid, and mandelic acid to chromatographic analysis using the above-mentioned liquid chromatograph.

In the present invention, as the mobile phase, a liquid containing no cyclodextrin and buffer solution, for example, a liquid containing phosphoric acid water or formic acid water and acetonitrile can be used. This makes it possible to prevent the occurrence of problems in the column and the apparatus due to the precipitation of salts.

By using the liquid containing no cyclodextrin and buffer solution as the mobile phase as described above, a mass spectrometer can be used as a detector.

Effects of the Invention

The separating column of the present invention is filled with the filler in which 123 μmol/g or more of β-cyclodextrin is chemically bonded to the silica matrix, whereby the hippuric acids can be separated and analyzed without using the mobile phase containing cyclodextrin.

The liquid chromatograph of the present invention uses the separating column filled with the filler in which 123 μmol/g or more of β-cyclodextrin is chemically bonded to the silica matrix, whereby the hippuric acids can be separated and analyzed without using the mobile phase containing cyclodextrin.

The analysis method of the present invention performs chromatographic analysis using the separating column filled with the filler in which 123 μmol/g or more of β-cyclodextrin is chemically bonded to the silica matrix, whereby the hippuric acids can be separated and analyzed without using the mobile phase containing cyclodextrin.

EMBODIMENTS OF THE INVENTION

Hereinafter, a separating column for hippuric acid analysis, a liquid chromatograph, and a method for analyzing hippuric acid according to the present invention will be described with reference to the drawings.

Figure 1:
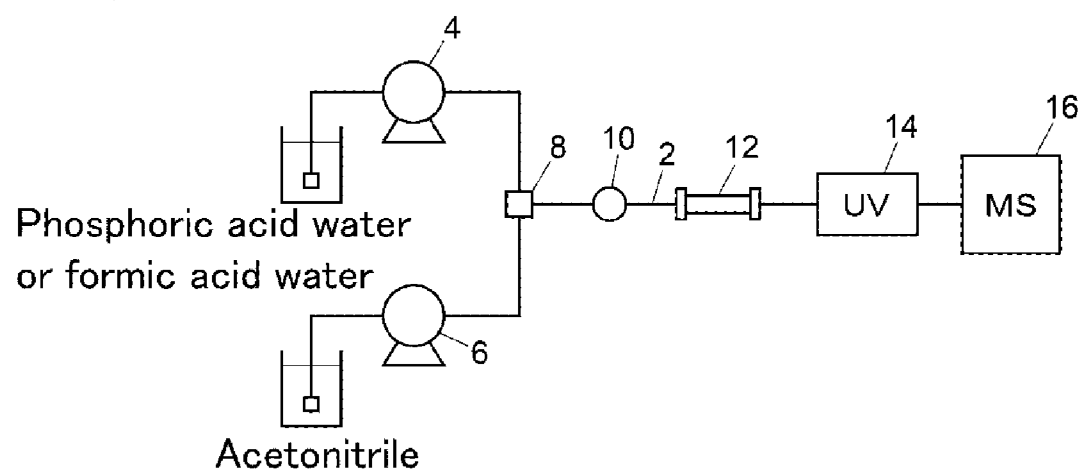
FIG. 1 is a configuration diagram schematically showing an example of a liquid chromatograph for hippuric acid analysis.

FIG. 1 is an example of a channel configuration of a liquid chromatograph for hippuric acid analysis.

A liquid chromatograph of this example includes liquid delivery pumps 4 and 6, a mixer 8, a sample injector 10, a separating column 12, an ultraviolet absorbance detector (UV) 14, and a mass spectrometer (MS) 16. The liquid delivery pump 4 delivers phosphoric acid water or formic acid water, and the liquid delivery pump 6 delivers acetonitrile. Liquids delivered by the liquid delivery pumps 4 and 6 are mixed in the mixer 8, and the mixture flows through an analysis channel 2 connected to a downstream side of the mixer 8.

The sample injector 10, the separating column 12, the UV 14 and the MS 16 are provided in this order from the upstream side in the analysis channel 2. The liquid delivery pumps 4 and 6 constitute a mobile phase liquid delivery unit for delivering a mobile phase to the separating column 12 through the analysis channel 2. The sample injector 10 injects a sample into the mobile phase which is delivered to the separating column 12 by the mobile phase liquid delivery unit including the liquid delivery pumps 4 and 6. The sample injected by the sample injector 10 contains at least two components of hippuric acid, o-methyl hippuric acid, m-methyl hippuric acid, p-methyl hippuric acid, and mandelic acid.

The separating column 12 is a separating column for hippuric acid analysis which is filled with a filler in which 123 μmol/g or more of β-cyclodextrin is chemically bonded to a silica matrix. The separating column 12 can separate all components of hippuric acid, o-methyl hippuric acid, m-methyl hippuric acid, p-methyl hippuric acid, and mandelic acid.

The UV 14 and the MS16 as a detector for detecting the components separated in the separating column 12 are connected to a downstream side of the separating column 12. In the liquid chromatograph, a liquid containing no cyclodextrin and buffer solution is used as a mobile phase, whereby the precipitation of salts does not occur in an analytical system. This allows analysis using the MS 16. Since the MS 16 is not an essential component, only the UV 14 may be provided as a detector.

Figure 2:
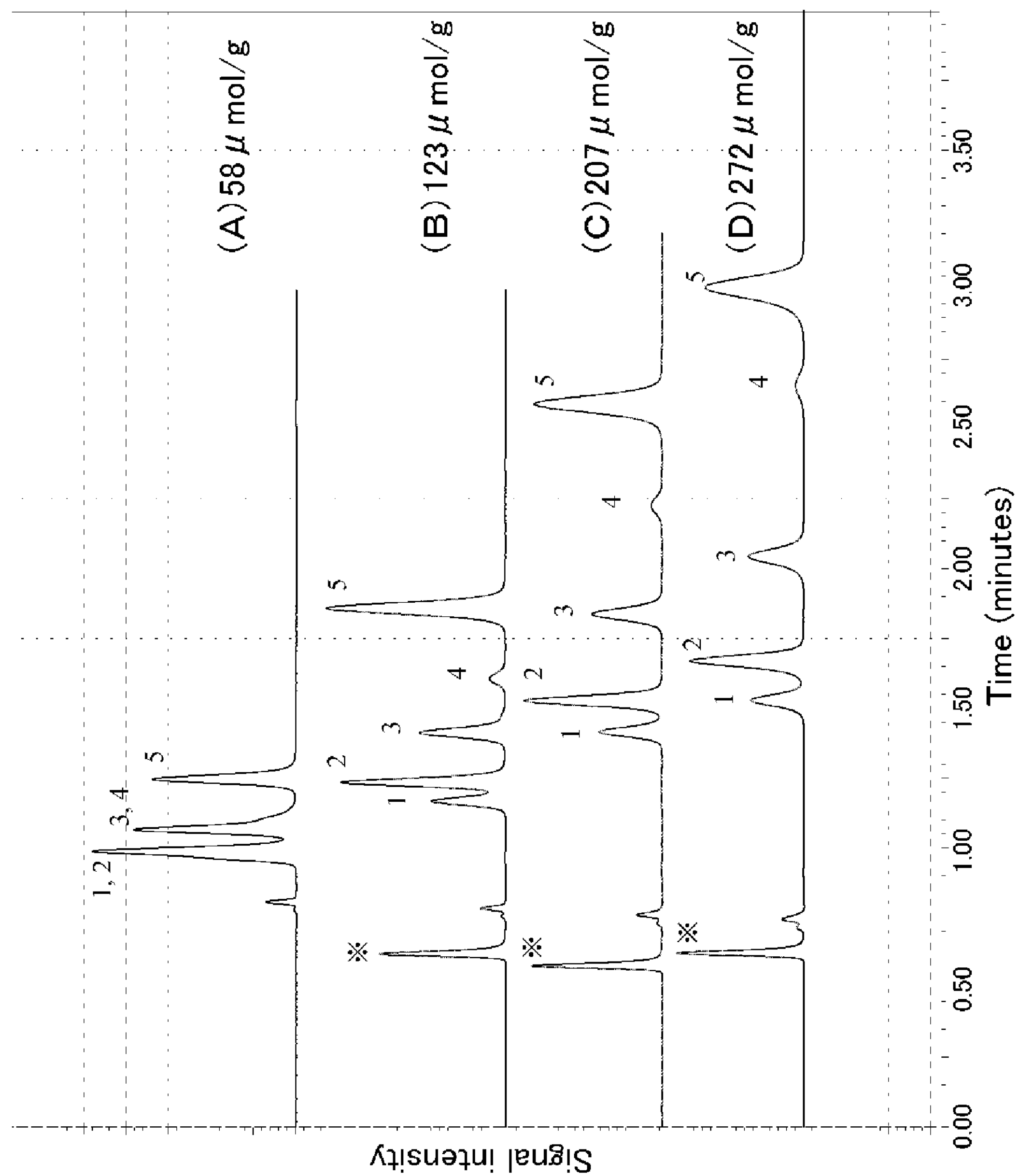
FIG. 2 is a chromatogram showing the relationship between the amount of β-cyclodextrin chemically bonded to a silica matrix of a filler for separating column and the degree of separation of hippuric acids.

FIG. 2 is a chromatogram showing the verification results of the relationship between the amount of β-cyclodextrin chemically bonded to the silica matrix of the filler for the separating column 12 of the liquid chromatograph and the degree of separation of hippuric acids. In FIG. 2(A), the amount of β-cyclodextrin chemically bonded to the silica matrix is 58 μmol/g; in FIG. 2(B), the amount of β-cyclodextrin chemically bonded to the silica matrix is 123 μmol/g; in FIG. 2(C), the amount of β-cyclodextrin chemically bonded to the silica matrix is 207 μmol/g; and in FIG. 2(D), the amount of β-cyclodextrin chemically bonded to the silica matrix is 272 μmol/g.

In the verification, a separating column having an inner diameter of 3 mm and a length of 100 mm was used. The particle size of silica gel of the filler with which the separating column is filled is about 2.2 μm. A liquid in which 0.1% phosphoric acid water and acetonitrile were mixed at a ratio of 9:1 was used as a mobile phase. The flow rate of the liquid was set to 0.8 mL/min, and the temperature of the separating column 12 (the set temperature of a column oven) was set to 40° C. Each of the chromatograms (A) to (D) was obtained by measuring the absorbance of light having a wavelength of 230 nm in the UV 14. Of the peaks in each of the chromatograms (A) to (D), "*" represents creatinine; "1" represents o-methyl hippuric acid; "2" represents hippuric acid; "3" represents m-methyl hippuric acid; "4" represents mandelic acid; and "5" represents p-methyl hippuric acid.

As shown in FIG. 2, it is found that, as the amount of β-cyclodextrin chemically bonded to the silica matrix is increased, the separation of "1" o-methyl hippuric acid, "2" hippuric acid, "3" m-methyl hippuric acid, "4" mandelic acid, and "5" p-methyl hippuric acid is improved. That is, as the amount of β-cyclodextrin chemically bonded to the silica matrix is increased, the degree of separation of the hippuric acids is improved.

When the amount of β-cyclodextrin chemically bonded to the silica matrix is 58 μmol/g, the peaks 1 and 2 are bonded to each other, the peaks 3 and 4 are bonded to each other, and o-methyl hippuric acid and hippuric acid are not separated from each other, and m-methyl hippuric acid and mandelic acid are not separated from each other. Meanwhile, when the amount of β-cyclodextrin chemically bonded to the silica matrix is 123 μmol/g, five peaks 1 to 5 appear, and the hippuric acids are separated. Therefore, it is found that, by adjusting the amount of β-cyclodextrin chemically bonded to the silica matrix to 123 μmol/g or more, the hippuric acids can be separated and analyzed without cyclodextrin being contained in the mobile phase.

As described above, as the amount of β-cyclodextrin chemically bonded to the silica matrix is increased, the retention of the hippuric acids is increased, but the increased retention causes an increased time until a component to be measured is eluted from the separating column 12. In order to perform analysis with high efficiency, it is ideal that the time until all components to be measured are detected is 5 minutes or less, and more preferably 4 minutes or less. According to the verification data in FIG. 2, it is found that, when the amount of β-cyclodextrin chemically bonded to the silica matrix is 272 μmol/g, p-methyl hippuric acid with the slowest elution from the separating column 12 among the hippuric acids is detected within 4 minutes, whereby, when the amount of β-cyclodextrin chemically bonded to the silica matrix is 272 μmol/g or less, high-speed analysis can be realized.

In the verification of FIG. 2, the mixed solution of phosphoric acid water and acetonitrile is used as the mobile phase, but the same results can be obtained by using formic acid water instead of the phosphoric acid water.

DESCRIPTION OF REFERENCE SIGNS

2: Analysis channel
4, 6: Liquid delivery pump
8: Mixer
10: Sample injector
12: Separating column
14: Ultraviolet absorbance detector (UV)
16: Mass spectrometer (MS)

The invention claimed is:

1. A method for analyzing hippuric acid, o-methyl hippuric acid, m-methyl hippuric acid, p-methyl hippuric acid, and mandelic acid, comprising the step of:

subjecting a sample containing hippuric acid, o-methyl hippuric acid, m-methyl hippuric acid, p-methyl hippuric acid, and mandelic acid to chromatographic analysis using a separating column filled with a filler in which 272 μmol/g of β-cyclodextrin is chemically bonded to a silica matrix, and separating all components of hippuric acid, o-methyl hippuric acid, m-methyl hippuric acid, p-methyl hippuric acid, and mandelic acid individually by the separating column.

2. The method according to claim 1, wherein a mobile phase used in the chromatographic analysis contains phosphoric acid water or formic acid water and acetonitrile.

3. The method according to claim 1, further comprising the step of detecting separation of all the components of hippuric acid, o-methyl hippuric acid, m-methyl hippuric acid, p-methyl hippuric acid, and mandelic acid within 4 minutes.

* * * * *